United States Patent [19]

Cantini

[11] Patent Number: 4,523,977

[45] Date of Patent: Jun. 18, 1985

[54] METHOD AND A DEVICE FOR ATTENUATING PRESSURE PULSES THROUGH FLUIDS, IN PARTICULAR FOR CONTINUOUS PAPER WEB PRODUCING MACHINES

[75] Inventor: Maurizio Cantini, Ascoli Piceno, Italy

[73] Assignee: Arnoldo Mondadori Editore S.p.A., Milan, Italy

[21] Appl. No.: 520,192

[22] Filed: Aug. 4, 1983

[30] Foreign Application Priority Data

Sep. 7, 1982 [IT] Italy ................ 23144 A/82

[51] Int. Cl.³ .............................. D21F 1/06
[52] U.S. Cl. ................... 162/259; 162/380; 138/26; 138/30
[58] Field of Search .............. 162/380, 336, 259, 341; 138/26, 30; 137/207

[56] References Cited

U.S. PATENT DOCUMENTS 4,166,759 9/1979 Kirjavainen ................ 162/380
4,169,757 10/1979 Kirjavainen ................ 162/380
4,262,700 4/1981 Moen ................ 162/380

Primary Examiner—William F. Smith
Attorney, Agent, or Firm—Bert J. Lewen; Norbert Holler

[57] ABSTRACT

A device for attenuating pressure pulses through fluids, in particular for continuous paper web producing machines, which comprises a tubular element having an inner body formed from a resilient material and an outer body formed from a rigid material, between which bodies an annular compensating chamber is provided which contains a pressurized fluid whose pressure can be varied automatically according to variations occurring in the pressure level of the fluid being conveyed, which result in said inner body of a resilient material undergoing deformation.

A multilayered structure may be provided for the inner resilient body. The insertion of the attenuating device is accomplished in line with the feed conduit of the aqueous suspension to the intake tank.

4 Claims, 8 Drawing Figures

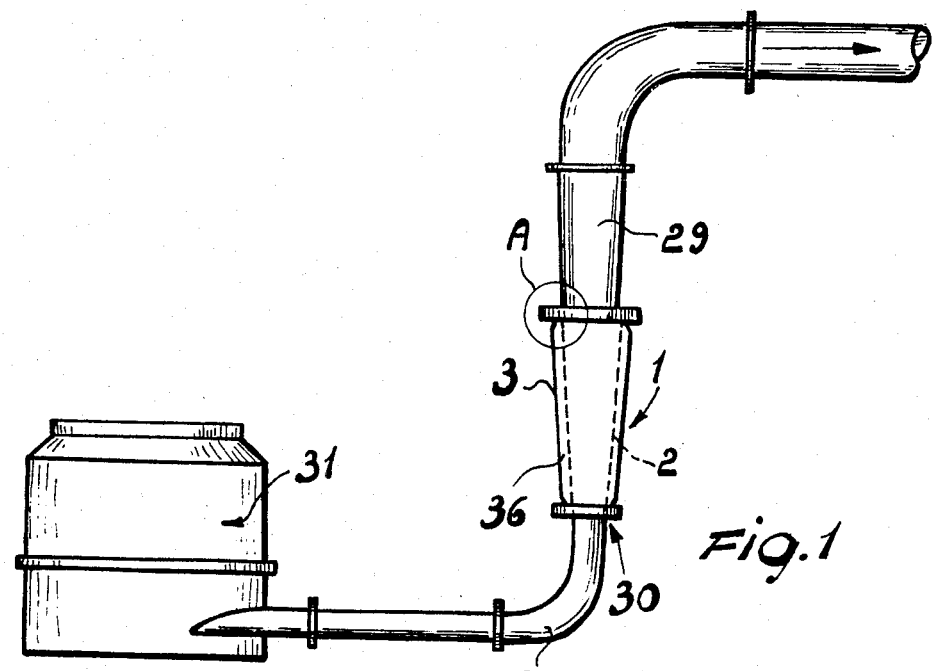
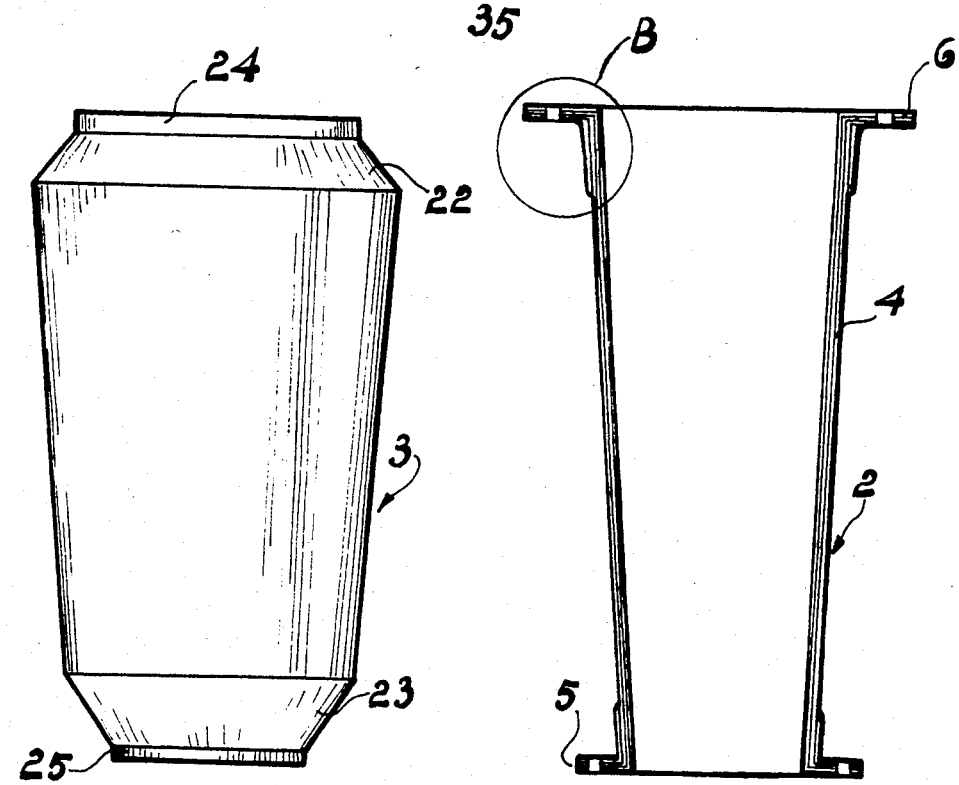
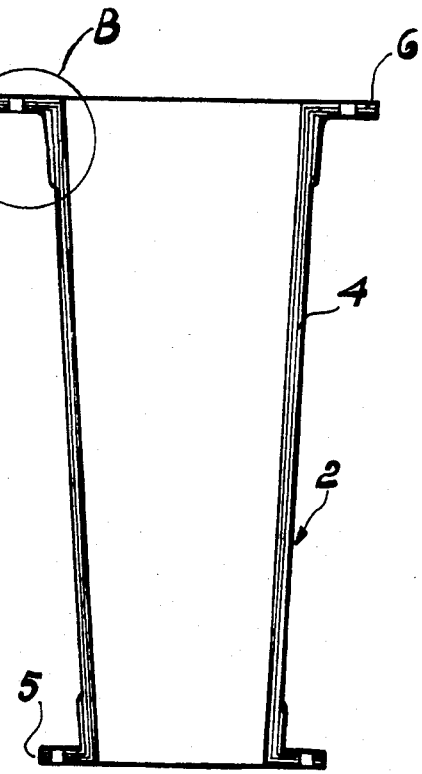

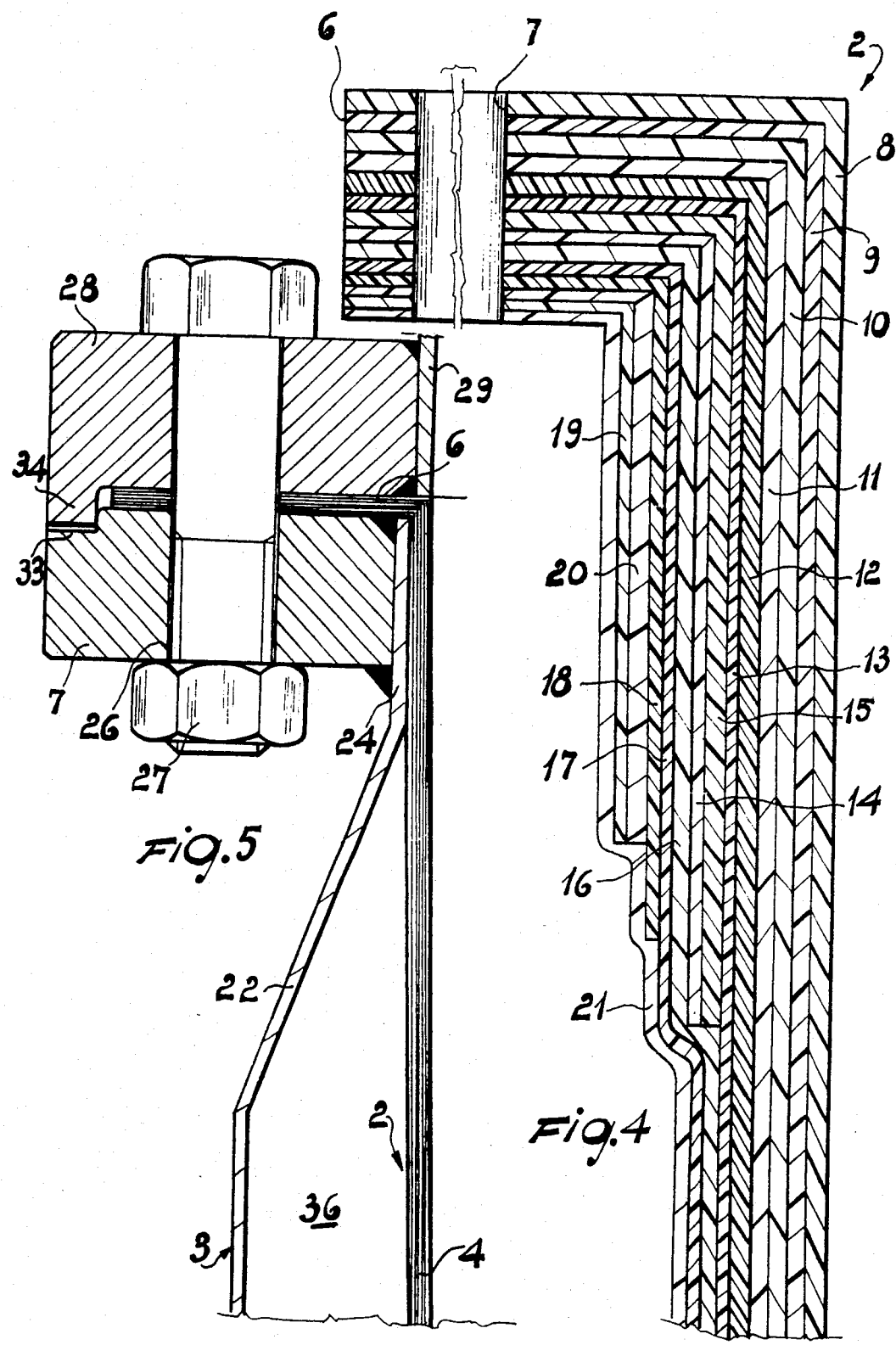

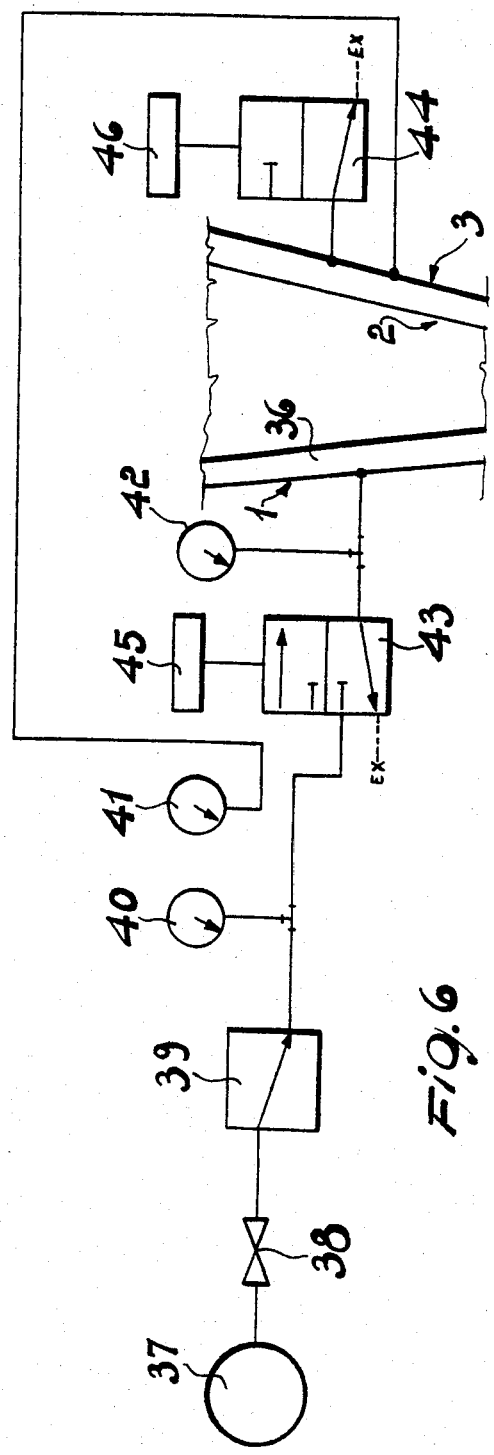
Fig. 6
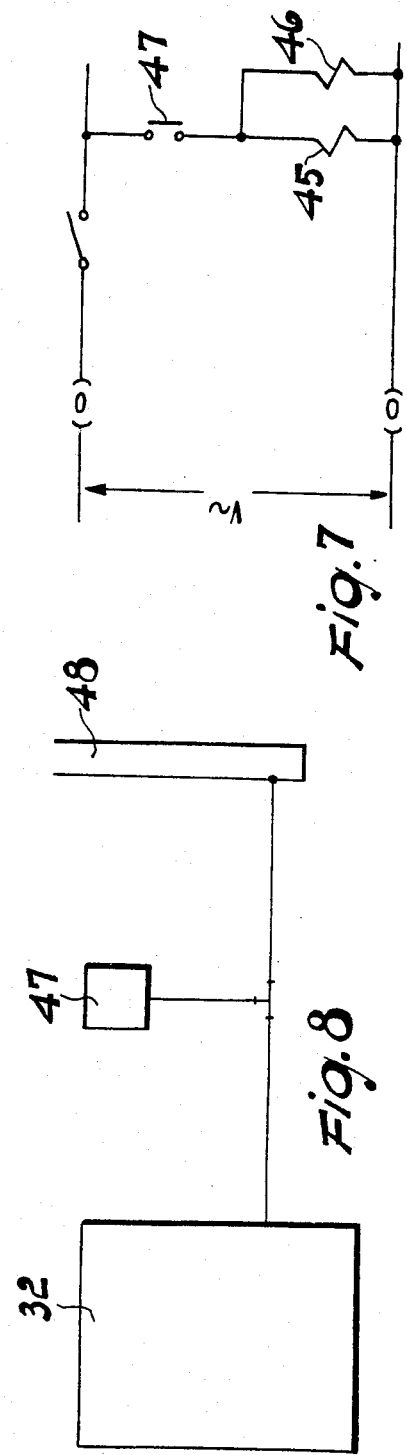
Fig. 7
Fig. 8

METHOD AND A DEVICE FOR ATTENUATING PRESSURE PULSES THROUGH FLUIDS, IN PARTICULAR FOR CONTINUOUS PAPER WEB PRODUCING MACHINES

BACKGROUND OF THE INVENTION

This invention relates to a method and a device for attenuating pressure pulses through fluids, in particular for continuous paper web producing machines.

With continuous paper web making machines, e.g. newspaper printing paper making machines, the aqueous suspension for the formation of the web is currently spread or distributed across the draining cloth of the continuous machine by means of an intake tank, which is in turn connected to the slurry epuration system through a feed conduit.

A determining requisite of paper web making is unexceptionable uniformity of thickness in the lengthwise direction of the web. Lack of uniformity or unevenness of the web result, in fact, in irregularities in the course of the following coating process, which reflects, in turn, into further uneven absorption and drying of the ink when printing. The net result is derating of the print quality to sometimes unacceptable limits and attendant waste of an expensive material.

Care is therefore taken to provide the highest possible degree of homogeneity in the aqueous suspension flow already upstream of the intake tank, so as to achieve the highest uniformity in the spreading thereof through the sheet, and as a direct consequence, in the weight per unit area of the paper produced.

The problem outlined hereinabove is further aggravated in the instance of lightweight substance and high production rate.

As an example, with a substance of 30-50 g/m$^2$ in paper webs produced on continuous machines having an output rate of 900-1,000 m/minute, there occur wrinkle marks due to the tensions originated in the paper sheet by uneven drying of said web through the drying cylinders of the continuous machine owning to uneven thickness.

In the light of the foregoing, it will be appreciated that if to prevent such uneven thickness formations the output rate is brought down to 100-200 m/minute, for example, then this would reflect in a most adverse way on the economy of the production cycle.

During the web manufacturing process, moreover, increased uneven spots in the paper thickness may also lead to the formation of "holes" through the paper web, so that production would have to be discontinued for a while in order to remove the problem. Given the high output rate, it is evident that discontinuing the operation of the continuous machine results in heavy production losses.

In an attempt at obviating the above drawbacks, so-called "expansion chambers" have been used heretofore which are either shunted from the aqueous suspension feed line or inserted, in the capacity of a spillway, directly in the intake tank, such expansion chambers being also called "surge tanks" and "overflow tanks", respectively.

In prior expansion chambers, the aqueous suspension is allowed to expand and reach a higher level each time that it undergoes disturbances of the character of pressure surges in consequence of the unavoidable interference caused by the various components comprised in the hydraulic circuit, such as filters, pumps, stirrers, and the like, located upstream of the feed conduit to the intake tank.

In actual practice, the effectiveness of these devices has shown to be rather low, because said interference actually extinguishes itself inertially by self-dampening.

SUMMARY OF THE INVENTION

It is a primary object of this invention to obviate the drawbacks and deficiencies of prior attenuating devices.

This object is achieved by a pulse attenuating device, in particular for continuous paper web producing machines, which is characterized, according to this invention, in that it comprises a tubular element having an inner body formed from a resilient material and an outer body formed from a rigid material, between said bodies a compensating chamber being provided wherein a pressurized fluid is admitted, and that said tubular element has a circuit for detecting and controlling the pressure of said fluid in said compensating chamber associated therewith, there being provided a means of connecting said aqueous suspension feed conduit to said intake tank.

Within the aforementioned object, this invention also provides a method of treating the aqueous suspension upstream of the intake tank, which method is characterized in that it comprises the following process steps:

(a) deformation of one wall of the feed circuit for said aqueous suspension upon the pressure level therein deviating from a preset value;

(b) detection of said deformation and measurement of the extent thereof; and (c) creation of a compensating pressure acting on said deformable wall for the purpose of cancelling the deformation thereof, said compensating pressure acting within an interspace formed between a rigid reaction wall and said deformable wall.

Further features of the device and method according to this invention will be apparent from the following description.

The pulse attenuating device in accordance with the invention preferably is characterized by an inner body formed from a resilient material having a multilayered structure consisting of alternating rubber layers, woven rayon layers and polyester fabric layers and including a tubular jacket with end flange portions forming together an integral construction, whereby the inner body of a resilient material has at the flange portions a number of layers, or thickness, exceeding the tubular jacket portion.

The pulse attenuating device in accordance with the invention preferably is also characterized by an outer body comprising a tubular sector, advantageously of stainless steel, having tapering end portions with a cylindrical rim firmly associated with a flange ring, the inside diameter of the cylindrical rims being substantially equal to or slightly smaller than the outside diameter of the associated end portion of the tubular jacket of the inner body formed from a resilient material, and the connective parts forming means of connection to the feed conduit.

A pulse attenuating device in accordance with the invention preferably is also characterized in that on the flange of the outer body and on the flange of the associated conduit sector, there are provided, respectively, a depression and an annular projection arranged to fit together and adjoining the thickness of the respective flange of the resilient inner body, the locking of the flanges being accomplished by means of a plurality of bolts arranged at regular intervals in the circumferential direction.

A pulse attenuating device in accordance with the invention preferably is also characterized in that it has a slightly tapering configuration, its length being 2 to 8 times the average diameter thereof, preferably 3 to 6 times the diameter.

A pulse attenuating device in accordance with the invention preferably is also characterized in that the annular compensating chamber has an inlet and an outlet for the admission of pressurized fluid, such as compressed air, with the compensating chamber there being associated an electro-pneumatic circuit adapted for sensing the pressure value of the fluid in the compensating chamber, and upon deviation from a preset value, which can be set, for acting on the pressurized fluid to create dampening differentials allowing control, or cancellation, of the pressure changes of an interfering character occurring in the fluid being conveyed.

A pulse attenuating device in accordance with the invention preferably is also characterized in that it is mounted "in-line" with the feed conduit.

Also in accordance with the invention, a method of treating a fluid, e.g. the aqueous slurry suspension in continuous paper web producing machines, characterized in that it comprises the following operative steps: expanding one portion of the feed circuit of the aqueous suspension as a preset pressure value varies therein; sensing the expansion and measuring the extent thereof; and forming a compensating pressure acting on the expandable wall for the purpose of cancelling the expansion thereof, the compensating pressure acting in an interspace formed between a rigid reaction wall and the deformable wall.

In practice, the proposed attenuation device and method afford the advantage of a comparatively simple construction and assembling, on one side, and automatic cancellation of pressure disturbances occurring in the aqueous suspension or the like, on the other side, thereby it becomes possible to produce perfect quality paper webs both in lightweight substance and at high output rates.

In practice, it has been advantageously found that the device and method of this invention can considerably improve the quality of the paper web produced, and this not only with lightweight substance and at high output rates but also with heavyweight substance and relatively low output rates, e.g. in the order of 300–500 m/minute, where products are involved which require extremely constant thickness dimensions and specially uniform weight and porosity.

In practice, it has been found that with the proposed device, also removed are all those annoying pulses from the hydraulic circuit, upstream of the continuous machine, which would otherwise require extremely expensive modifications in the upstream system.

BRIEF DESCRIPTION OF THE DRAWINGS

Further advantages, details, and features of the device for attenuating pressure pulses through fluids, in particular for continuous paper web producing machines, according to this invention, will be more readily apparent from the following description, with reference to the accompanying drawings, which illustrate, by way of example and not of limitation, a preferred embodiment of the inventive device.

In the schematic representations of the drawings:

FIG. 1 shows a riser feeding the aqueous suspension into the intake tank, not shown;

FIGS. 2 and 3 show, to an enlarged scale with respect to FIG. 1, the body forming the outer wall and the body forming the inner wall, respectively, of the attenuating device according to the invention;

FIG. 4 is an enlarged scale detail view of the portion B of FIG. 3;

FIG. 5 is an enlarged scale detail view of the portion A of FIG. 1;

FIG. 6 shows a pneumatic circuit for sensing and controlling the compensation pressure in the inventive device; and FIGS. 7 and 8 show, respectively, a detail of an electric and pneumatic circuit associated with the pneumatic circuit of FIG. 6.

DESCRIPTION OF THE PREFERRED EMBODIMENT

In the drawing figures, where similar parts are designated with the same reference characters, the pulse attenuating device, in particular for continuous paper web producing machines, according to this invention, is generally indicated at 1.

This device comprises an inner body 2 of a resilient material, and an outer body 3 of a rigid material, advantageously of stainless steel. The inner body 2 has a tubular jacket 4 which is formed at the bottom and at the top with flanges, respectively 5 and 6. As clearly shown in the detail view of FIG. 4, the inner body includes a plurality of layers adapted to create a flexible configuration, or a resilient one, with additional strengthening layers at the end portions, that is at the areas thereof which are more likely to be stressed. In the embodiment shown, one that has afforded in actual practice optimum results, alternating layers, 8 to 21, are provided which comprise rubber mixes forming coating layers reinforced with rayon, polyester, and the like fabrics, with a suitable circumferential or wrapping arrangement.

The outer body 3 is formed, as mentioned, from a rigid material, expediently, from stainless steel. It has a substantially frusto-conical configuration with end portions 22,23 which are tapered and have a cylindrical rim, 24,25, the inside diameter whereof is substantially equal to the outside diameter of the tubular jacket 4 at the respective end portions. The assembling of the inner body 2 to the outer body 3 is apparent from FIG. 5. It may be also noted, from that figure, that in the embodiment considered, welded to the upper cylindrical rim 24 of the outer body 3 is the ring flange 7 having a plurality of holes 26 arranged at regular intervals along its circumference, for accommodating fastening bolts 27 clamping together said flange 7 and a flange 28 of the upper sector 29 of the riser 30 for admitting the aqueous suspension from the upstream system, indicated at 31, into the intake tank, indicated at 32 in FIG. 8. As may be seen in FIG. 5, the flange 7 has a depression 33, and the flange 28 an annular projection 34 engaging with the former to ensure a higher degree of rigidity. Fastening of the lower portion of the attenuating device 1 to the lower sector 35 of the riser 30 is accomplished similarly to all that has been described for flanges 7 and 28.

Indicated at 36 is an annular chamber or closed interspace formed between the inner body 2 and outer body 3. Into this interspace, according to the invention, a pressurized fluid is admitted, such as air, to thus create a compensating chamber affording advantageous adjustment features. In fact, by operating on the pressure detected inside the interspace, it becomes possible, as the same varies, or as the pressure of the fluid being conveyed varies, to create within the interspace 36 "dampening" differentials acting on the deformable inner body and allowing a quick dampening and cancelling of pressure changes having a disturbing or interfering character in said fluid being conveyed.

This procedure may be accomplished by means of circuits of various configurations, e.g. as shown in FIGS. 6, 7 and 8 as regards the electropneumatic circuit used.

Indicated at 37 in FIG. 6 are a pressurized air manifold, at 38 a shut-off valve, at 39 a pressure limiter, at 40 a detector of the set pressure value, and at 41 and 42 two detectors of the pressure response value, at 43 and 44 there being indicated two valves including solenoids 45 and 46. The reference numeral 47 designates a switch which closes at a preset threshold pressure level. Lastly, at 48, there is indicated a manometric column connected to the intake tank 32.

By means of a millimeter graduated rod, not shown, which may be coupled with a signal emitter, also not shown, it is possible to detect the actual position of the tubular jacket, and hence the instantaneous working conditions of the attenuating device according to the invention.

In the event of a sharp pressure drop occurring within the feed conduit 30, also immediately reduced is the compensating pressure within the pressurized interspace 36, thereby avoiding dangerous tensions in the rubber body 2 of the attenuating device 1.

The method of treating the aqueous suspension providing, according to this invention, for an expansion step for expanding a portion of the aqueous suspension feed conduit upon exceeding a preset threshold pressure value thereof, as well as for a detection step of said expansion and measurement of the extent thereof, as well as for a step of creation, within the interspace 36, of a compensating pressure which acts on said expandable portion for the purpose of cancelling the expansion thereof, can be implemented without difficulty with apparatus and circuits other than those described above.

It will be appreciated from the foregoing that with the attenuating device of this invention and the proposed fluid treatment method, the object of this invention can be effectively achieved, and the cited advantages secured. In particular, the possibility is afforded of automatically cancelling the pressure interference which occurs in the fluid being conveyed with an attenuating device which is of simple construction and reliable in operation. The effectiveness of the attenuating device according to the invention has been also evidenced by checks and measurements of substance variation carried out on paper produced with and without the attenuator, as well as by the frequency and amplitude spectra in the intake tank with attenuator at various pressure values in the interspace, and by the behavior of the attenuator at various pressures. It has been further found that, owing to the section changes occurring in the attenuating device during the cancellation of pressure disturbance, there advantageously occurs a deflocculation of the aqueous suspension, with attendant advantageous improvement of the paper sheet quality.

Said deforming movements of the attenuator jacket, moreover, advantageously impart to the inner surface of the same, as ascertained in actual practice, optimum self-cleaning features which rule absolutely out any formations of deposits thereon.

In practicing the invention, it will be possible to replace individual parts with other technically and/or functionally equivalent parts, without departing from the protection scope of this invention. In practice, moreover, the dimensions of the proposed attenuating device, and the selected materials may be any desired ones, or ones meeting the requirements of each specific case, again without departing from the protective scope of this invention, and the same may be utilized in any other fields showing comparable problems.

A more detailed description of the operation and design of the circuits and their apparatus has been omitted herein because their design, or selection, can be made by a skilled person in the art without difficulty.

Of substantial import to the invention is instead the provision, in the feed conduit to the intake tank, of a resilient portion and associated compensating chamber, the deformation whereof results in changes in the velocity of the fluid being conveyed. According to the invention, the resilient portion is provided "in-line" with said aqueous suspension feed conduit, that is as a structural part coaxial therewith.

Although the proposed attenuating device has been described as included in the riser, it would be equally possible to provide it in a horizontal or oblique line, or at any other location therealong.

All of the characteristics which may be inferred from the specification, claims, and accompanying drawings, are regarded as substantial to this invention, both individually and in any combinations thereof.

What is claimed is:

1. A pulse attenuating device for a continuous paper web production machine which comprises:
   (a) an outer rigid body having a conical central housing; cylindrical rim portions spaced axially from each end of the central housing, the diameter of each of said rim portions being less than the diameter of the corresponding end of the central housing; tapered end portions joining the ends of the central housing to the corresponding rim portions; and ring flanges projecting radially from said cylindrical rim portions;
   (b) a resilient inner body extending through said outer rigid body so as to define between said bodies an annular compensating chamber, said inner body comprising a multi-layered tubular jacket having a central portion and flared end portions and composed of alternating rubber, woven rayon and polyester fabric layers; and reinforcing means consisting of a plurality of additional layers overlying each end of said central portion and said flared end portions of the tubular jacket, so as to form an integral structure therewith, the outside diameter of the reinforcing means which overlies the end portion of said central portion of said tubular jacket being substantially equal to the inner diameter of the corresponding rim portion;
   (c) sealing means for affixing circumferentially the flared end portions of said reinforcing means to the ring flanges of said outer rigid body and adapted to secure a feed conduit to one end of said pulse attenuating device and an outlet conduit to the other end of said pulse attenuating device, the internal diameter of each conduit being substantially equal to the internal diameter of the corresponding end of the resilient inner body so that, when conduits are connected to the pulse attenuating device, a smooth, uninterrupted passageway is formed from the feed conduit through the pulse attenuating device and into the outlet conduit.

2. The pulse attenuating device of claim 1 wherein the ring flanges are adapted to engage flanges on the feed conduit and the outlet conduit so as to secure the end portions of the pulse attenuating device to said conduits and means being provided to receive the flared flange portions of the inner body between said flanges.

3. The pulse attenuating device of claim 1 wherein the central housing has a slightly tapering configuration and is of a length 2 to 8 times the average diameter thereof.

4. The pulse attenuating device of claim 1 further comprising inlet and outlet means for the passage of pressurized fluid to the annular compensating chamber, an electro-pneumatic circuit adapted for sensing the pressure value of the fluid in said compensating chamber and deviation from a preset value, means for controlling the pressure of the pressurized fluid in the compensating chamber so as to create damping differentials for modifying pressure changes occurring in the fluid being conveyed through the paper web production machine.

* * * * *